United States Patent
Atinault

(10) Patent No.: US 7,866,608 B2
(45) Date of Patent: Jan. 11, 2011

(54) DEVICE FOR CONTROLLING A VORTEX TRAIL GENERATED BY THE OBLONG ELEMENT OF AN AIRCRAFT BEARING SURFACE

(75) Inventor: Olivier Atinault, Toulouse (FR)

(73) Assignee: Airbus France, Toulouse (FR)

( * ) Notice: Subject to any disclaimer, the term of this patent is extended or adjusted under 35 U.S.C. 154(b) by 473 days.

(21) Appl. No.: 12/067,914

(22) PCT Filed: Sep. 13, 2006

(86) PCT No.: PCT/FR2006/002092

§ 371 (c)(1),
(2), (4) Date: Mar. 24, 2008

(87) PCT Pub. No.: WO2007/036621

PCT Pub. Date: Apr. 5, 2007

(65) Prior Publication Data

US 2009/0039203 A1 Feb. 12, 2009

(30) Foreign Application Priority Data

Sep. 30, 2005 (FR) .................... 05 09983

(51) Int. Cl.
*B64C 23/06* (2006.01)
(52) U.S. Cl. .................... 244/199.1; 244/130; 244/198; 244/204; 244/214; 244/204.1
(58) Field of Classification Search ................ 244/130, 244/198, 204, 214, 204.1, 199.1, 199.2, 199.4, 244/200.1, 201

See application file for complete search history.

(56) References Cited

U.S. PATENT DOCUMENTS

| 3,744,745 | A | * | 7/1973 | Kerker et al. | 244/199.1 |
| 3,968,946 | A | * | 7/1976 | Cole | 244/214 |
| 4,323,209 | A | * | 4/1982 | Thompson | 244/199.1 |
| 4,540,143 | A | * | 9/1985 | Wang et al. | 244/130 |
| 4,643,376 | A | * | 2/1987 | Vanderhoeven | 244/198 |
| 4,685,643 | A | | 8/1987 | Henderson | |
| 5,156,362 | A | * | 10/1992 | Leon | 244/200.1 |
| 6,126,118 | A | * | 10/2000 | Fujino et al. | 244/130 |
| 6,964,397 | B2 | * | 11/2005 | Konings | 244/199.1 |
| 2004/0046086 | A1 | | 3/2004 | Dixon | |

OTHER PUBLICATIONS

International Search Report dated Jan. 29, 2007 w/ English translation.
Written Opinion of the ISA w/ English translation.

* cited by examiner

*Primary Examiner*—Timothy D Collins
*Assistant Examiner*—Justin Benedik
(74) *Attorney, Agent, or Firm*—Dickinson Wright PLLC

(57) ABSTRACT

A device for controlling a vortex trail generated by an oblong element of an aircraft bearing surface includes a control component arranged on a fixing element of the oblong element and on a bearing surface such that a base of the control component contacts the leading edge of the bearing surface. The control component has a triangular shape, on a plane perpendicular to the longitudinal axis thereof, whose two adjacent sides form flanks interconnected by a rounded edge.

6 Claims, 2 Drawing Sheets

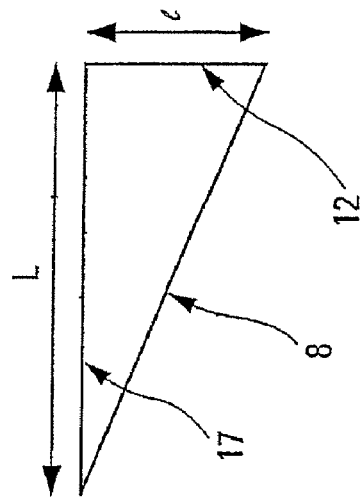
Fig. 4
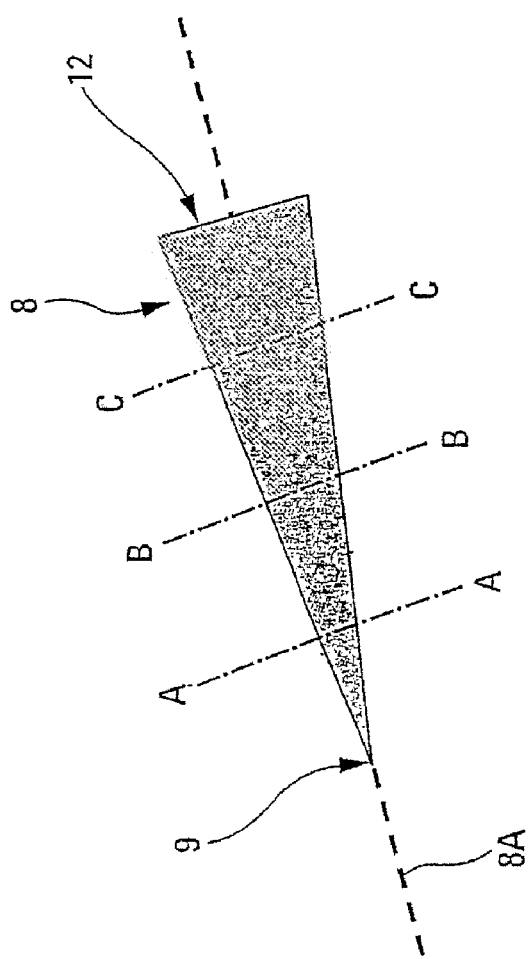
Fig. 2
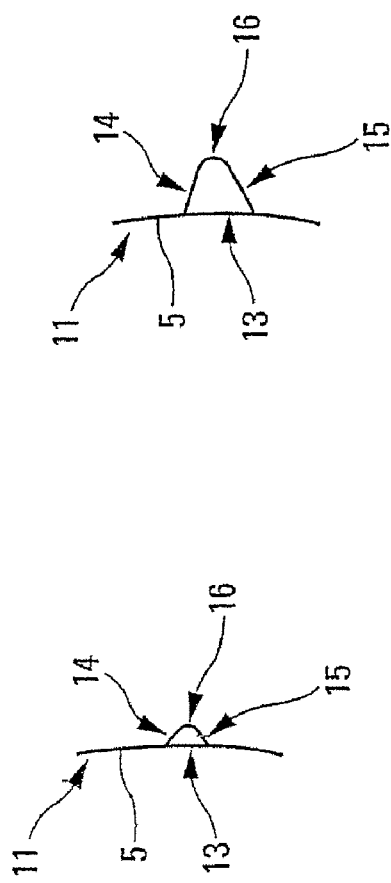
Fig. 3C
Fig. 3B
Fig. 3A

DEVICE FOR CONTROLLING A VORTEX TRAIL GENERATED BY THE OBLONG ELEMENT OF AN AIRCRAFT BEARING SURFACE

FIELD OF THE INVENTION

The present invention relates to a device for controlling at least one vortex trail generated on the suction-face side of a lift-generating surface of an aircraft, said vortex trail being generated by at least one oblong element which is mounted under this lift-generating surface.

More specifically, although not exclusively, the present invention applies to the control of fluid flows over the suction-face side of the wings of an airplane, which are equipped with oblong elements such as jet engines, in-flight refuelling pods or payloads, for example missiles. The objective is, more specifically, that of controlling the vortex trail at an airplane position close to stalling conditions so as to improve the maximum lift that the airplane wing structure can produce in the presence of one or more oblong elements such as those mentioned above.

BACKGROUND OF THE RELATED ART

Documents U.S. Pat. Nos. 3,744,745 and 4,685,643 disclose wake-control devices which are designed to act on the vortex trail generated on the wing of an airplane by a jet engine nacelle mounted under this wing. These conventional control devices comprise at least one control means which is arranged directly on the nacelle on one side thereof. This control means is distant from the leading edge of the corresponding wing and situated upstream of this leading edge. In addition, this conventional control means has an elongate shape, its longitudinal axis being substantially parallel to a local fluid flow and its upstream end possibly being pointed.

A conventional control means such as this generates an additional vortex intended to control the vortex trail.

This additional vortex has therefore to travel as far as the wing if it is to be able to act on said vortex trail that is to be controlled. Now, since the distance between this control means and said vortex trail is relatively great, it is difficult to find an appropriate position for said control means on the nacelle in order to lead the additional vortex precisely to the vortex trail. In addition, the path of this additional vortex varies generally according to the speed of the airplane and its angle of incidence.

Hence, in order to obtain a high-energy additional vortex which is able to act on said vortex trail irrespective of the situation, the control means described in the aforementioned documents have the shape of a flat plate, of very small thickness. It is known that a control means that has very angular edges (as is the case with such a plate) generates a powerful additional vortex and generally does so irrespective of the angle of incidence of the airplane. Because of the latter characteristic, a conventional control means does, nonetheless, have the disadvantage of also generating an additional vortex at airplane low angles of incidence, particularly in cruising flight, and this in particular leads to an unwanted increase in drag during this phase of the flight.

As a result, a conventional control device of the aforementioned type is not entirely satisfactory.

The present invention relates to a control device on the suction-face side of a lift-generating surface of an aircraft for controlling at least one vortex trail generated by at least one oblong element which is mounted under this lift-generating surface protruding partially beyond the leading edge of said lift-generating surface (particularly an airplane wing), in the upstream direction, which device provides a solution to the aforementioned disadvantages.

SUMMARY OF THE INVENTION

To that effect, according to the invention, said device of the type comprising at least one control means:
  which is arranged at the level of said oblong element; and
  which has an elongate shape, its longitudinal axis being substantially parallel to a local fluid flow and its upstream (with respect to said local fluid flow) end being pointed,
is notable in that said control means:
  is produced (entirely) in the form of a point which is triangular both when viewed from the side and when viewed from the top;
  is arranged both on a fixing element (specified hereinbelow) used to secure the oblong element and on the lift-generating surface in such a way that the base of said point (which corresponds to its downstream end) is brought into contact with the leading edge of said lift-generating surface; and
  has a shape which is substantially triangular in a plane perpendicular to said longitudinal axis and which has a first side intended to come into contact with said fixing element and two adjacent sides forming flanks, said flanks being joined together by a rounded edge.

Thus, by virtue of the invention:
since the base of the control means is brought into contact with the leading edge of the lift-generating surface, the additional vortex generated by the control means naturally passes directly over the suction-face side of the lift-generating surface, where the vortex trail that is to be controlled is located;
since said control means has a triangular shape comprising two adjacent flanks, the local flow at the oblong element acts on the control means via one of the flanks which have very large positive local angles of incidence, causing the generation of an additional vortex of viscous origin (at low speed) as specified hereinbelow; and
since the control means has a rounded edge between the two flanks, said control means can be bypassed by the local fluid flow in the cruising phase of the flight, that is to say at local angles of incidence at the control means which are small and range, for example, between −5° and +5°, thus avoiding any boundary layer separation in such flight situations.

As a result, the control means according to the invention generates an additional vortex of viscous origin when positioned at a steep angle of incidence with respect to its main axis, that is to say when the wing structure of the aircraft is close to stalling conditions. In the context of the present invention, a viscous vortex should be understood to mean a vortex spinning off from a singular point of zero parietal friction at the wall, the initial axis of which is perpendicular to the wall. This additional viscous vortex adds to and stabilizes along the wing span the vortex trail/shed by the oblong element. This stabilizing makes it possible to keep the vortex system close to the wing structure and parallel to the axis of the oblong element. By contrast, this additional vortex is not generated when the control means (which has a triangular shape with two adjacent flanks joined together by a rounded edge, rather than a flat plate shape) is positioned at low angles of incidence, that is to say at angles of incidence that correspond to the attitude of a conventional airplane during the cruising phase of the flight.

The control device according to the invention therefore provides a solution to the aforementioned disadvantages. Of course, the aforementioned position and especially the shape of the control means are features that are essential to its effectiveness.

In one particular embodiment, said control means has, when viewed from when above, a triangular shape in which, on the one hand, the length L of the side facing the fixing element and, on the other hand, the length l of the side in contact with the lift-generating surface satisfy the following relationship:

$$L \geq l \geq L/10.$$

Furthermore, in one preferred embodiment, said control device comprises two control means which are positioned one on each side of the fixing element.

It will be noted that, in the context of the present invention, said fixing element may correspond:
- either to said oblong element (a turboprop nacelle or an in-flight refuelling pod for example) when the latter is fixed directly under the lift-generating surface,
- or to a support (an engine pylon or a support for external stores for example) allowing said oblong element (a jet engine or a payload for example) to be fixed under said lift-generating surface.

In addition, in the context of the present invention, said lift-generating surface may correspond to any surface of the aircraft which contributes to providing the latter with lift, and of course, in particular, to the wings of an airplane that form the wing structure thereof.

The figures of the attached drawing will make it easy to understand how the invention may be embodied. In these figures, references that are identical denote elements that are similar.

BRIEF DESCRIPTION OF THE DRAWINGS

FIG. 2 schematically illustrates a control means of a control device according to the invention.

FIGS. 3A, 3B and 3C schematically illustrate various cross sections along the longitudinal axis of the control means depicted in FIG. 2.

FIG. 4 is a schematic view from above of a control means of a control device according to the invention.

DETAILED DESCRIPTION OF THE INVENTION

Figure 1:
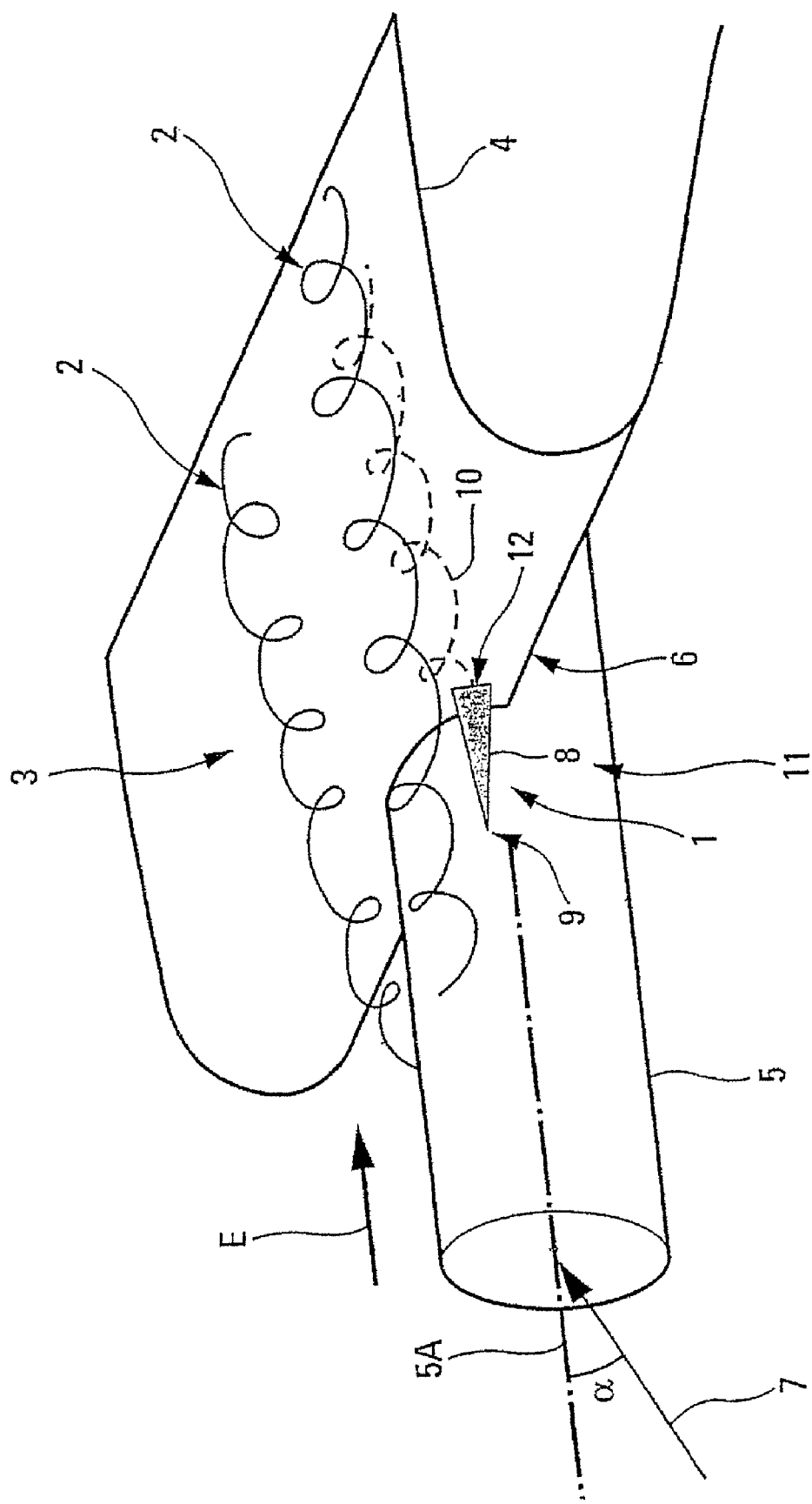
FIG. 1 schematically shows a control device according to the invention in operating position.

The device 1 according to the invention and depicted schematically in FIG. 1 is intended to control a vortex trail 2 that there is on the suction-face side 3 of a lift-generating surface 4 of an aircraft (not depicted), particularly on the suction-face side of an airplane wing. This vortex trail 2 is generated in the usual way (essentially at steep angles of incidence) by an oblong element 5 mounted under this lift-generating surface 4, and protruding in the upstream direction (in the direction E of the local fluid flow) at least partially beyond the leading edge 6 of said lift-generating surface 4. Said oblong element 5 may in particular be a jet engine, an in-flight refuelling pod or a payload such as a missile for example.

More specifically, it is an object of the device 1 according to the invention to control the vortex trail 2 for a position of the aircraft close to stalling conditions, that is to say for a local angle of incidence α (which is defined between the longitudinal axis 5A of the oblong element 5 and the air speed vector 7) which is steep, for example greater than 12°, so as to improve the maximum lift that the lift-generating surface 4 can generate when such an oblong element 5 is present.

To do this, said control device 1 is of the type comprising at least one control means 8 which is fixed at the level of said oblong element 5 and has an elongate shape, its longitudinal axis 8A being substantially parallel to the local fluid flow (arrow E) and its upstream end 9 being pointed. This control means 8 is able to create an additional vortex 10 specified hereinbelow.

According to the invention, said control means 8 also depicted in FIG. 2:
- is produced entirely in the form of a point (or dart) which is triangular both when viewed from the side and when viewed from above;
- is arranged both on a fixing element 11 (specified hereinbelow) for securing the oblong element 5 and on the lift-generating surface 4 in such a way that the base 12 of said point (which corresponds to the downstream end thereof in the direction E of the local fluid flow) is brought into contact with the leading edge 6 of said lift-generating surface 4; and
- has a shape which is substantially triangular in a plane perpendicular to said longitudinal axis 8A and which has a first side 13 intended to come into contact with said fixing element 11 and two adjacent sides forming flanks 14 and 15. These flanks 14 and 15 are joined together by a rounded edge 16 and make a large angle, preferably greater than 270°. This is depicted in FIGS. 3A, 3B and 3C which correspond to cross sections through said control means 8 perpendicular to its longitudinal axis 8A on respective section lines A-A, B-B and C-C as depicted in FIG. 2, spread along said longitudinal axis 8A.

In addition, the increasing size of the triangular shapes from FIGS. 3A to 3C clearly indicates that the control means 8 is produced entirely in the form of a point.

Thus, by virtue of the invention:
- since the base 12 of the control means 8 is brought into contact with the leading edge 6 of the lift-generating surface 4, the additional vortex 10 generated by the control means 8 naturally passes directly over the suction-face side 3 of the lift-generating surface 4, where the vortex trail 2 that is to be controlled is located;
- since said control means 8 has a triangular shape comprising two adjacent flanks 14 and 15, the local flow at the oblong element 5 acts on the control means 8 via one of the flanks which have very large positive local angles of incidence, for example angles in excess of 20°, causing the generation of an additional vortex 10 with a viscous core (at low speed) on the top of the control means 8, because of the very pronounced curvature of said control means 8 in a direction perpendicular to its longitudinal axis 8A. This additional vortex 10 interacts in a stabilizing fashion with the vortex trail 2, as specified hereinbelow; and
- since the control means 8 has a rounded edge 16 between the two flanks 14 and 15, said control means 8 can be bypassed by the local fluid flow in the cruising phase of the flight, that is to say at local angles of incidence at the control means 8 which are small and range, for example, between −5° and +5°, thus avoiding any boundary layer separation in such flight situations.

As a result, the control means 8 of the control device 1 according to the invention generates an additional vortex 10 of viscous origin when positioned at a steep angle of incidence with respect to its main axis 8A, that is to say when the wing structure of the aircraft is close to stalling conditions. In the context of the present invention, a viscous vortex should be understood to mean a vortex spinning off from a singular point of zero parietal friction at the wall, the initial axis of which is perpendicular to the wall. This additional viscous vortex 10 adds to and stabilizes along the wing span the vortex trail 2 shed by the oblong element 5. This stabilizing makes it possible to keep the vortex system close to the lift-generating surface 4 and parallel to the axis 5A of the oblong element 5. By contrast, this additional vortex 10 is not generated when the control means 8 is positioned at low angles of incidence, that is to say at angles of incidence that correspond to the attitude of a conventional airplane during the cruising phase of the flight. In this case, the longitudinal axis 8A of the control means 8 is aligned with the flow of the wind.

It will be noted that said fixing element 11 may correspond:
- either to said oblong element 5 (a turboprop nacelle or an in-flight refuelling pod for example) when the latter is fixed directly under the lift-generating surface 4 as depicted in the example of FIGS. 1, 3A, 3B and 3C;
- or to a support (a jet engine pylon or a support for external stores for example) allowing said oblong element (a jet engine or a payload for example) to be fixed under said lift-generating surface.

In one particular embodiment said control means 8 has, the one hand, the length L of the side 17 facing (when viewed from above) the fixing element 11 and, on the other hand, the length l of the side 12 in contact with the lift-generating surface 4 satisfy the following relationship:

$$L \geq l \geq L/10.$$

Furthermore, in a preferred embodiment which has not been depicted, said control device 1 comprises two control means 8 which are arranged one on each side of the oblong element 5 so as to be able to control the two vortex trails 2 generated on the suction-face side 3 of the lift-generating surface 4 on each side of said oblong element 5, as illustrated in FIG. 1.

The invention claimed is:

1. A control device on the suction-face side of a lift-generating surface of an aircraft for controlling at least one vortex trail generated by at least one oblong element which is mounted under this lift-generating surface protruding partially beyond the leading edge of said lift-generating surface in the upstream direction, said device comprising at least one control means:
- which is arranged at the level of said oblong element; and
- which has an elongate shape, its longitudinal axis being substantially parallel to a local fluid flow and its upstream end being pointed, wherein said control means:
- is produced in the form of a point which is triangular both when viewed from the side and when viewed from the top;
- is arranged both on a fixing element used to secure the oblong element and on the lift-generating surface in such a way that the base of said point, which corresponds to its downstream end, is brought into contact with the leading edge of said lift-generating surface; and
- has a shape which is substantially triangular in a plane perpendicular to said longitudinal axis and which has a first side intended to come into contact with said fixing element and two adjacent sides forming flanks, said flanks being joined together by a rounded edge.

2. The control device as claimed in claim 1, wherein said control mean has, when viewed from above, a triangular shape in which, on the one hand, the length L of the side facing the fixing element and, on the other hand, the length l of the side in contact with the lift-generating surface satisfy the following relationship:

$$L \geq l \geq L/10.$$

3. The control device as claimed in claim 1, wherein it comprises two control means which are positioned one on each side of the fixing element.

4. The control device as claimed in claim 1, wherein said fixing element corresponds to said oblong element which is fixed directly under said lift-generating surface.

5. The control device as claimed in claim 1, wherein said fixing element corresponds to a support allowing said oblong element to be fixed under said lift-generating surface.

6. An aircraft equipped with at least one lift-generating surface, wherein it comprises a control device like the one specified in claim 1.

* * * * *